United States Patent Office 3,065,201
Patented Nov. 20, 1962

3,065,201
SILICONE RUBBER OF IMPROVED HANDLING PROPERTIES
Thomas D. Talcott, Midland, Mich., assignor to Dow Corning Corporation, Midland, Mich., a corporation of Michigan
No Drawing. Filed Feb. 21, 1957, Ser. No. 641,442
2 Claims. (Cl. 260—46.5)

This invention relates to silicone rubber formulations having improved handling properties.

Silicone rubber is well recognized as superior to organic rubber in having excellent thermal stability. Until recently, however, silicone rubbers had relatively poor solvent resistance, i.e. they swelled when subjected to hydrocarbon solvents. It was then discovered that silicone rubbers were solvent resistant where essentially all of the silicon atoms in the siloxane contained at least one β-perfluoroalkylethyl radical each. This is shown in the copending application of Eric D. Brown, Serial No. 594,113, filed June 27, 1956, which is hereby incorporated in this specification by reference. However, it was subsequently found that when these fluoroalkylpolysiloxane stocks were milled on an ordinary two-roll rubber-compounding mill, the stocks sheared and went to both rolls of the mill. Consequently, it was impossible to calender only one fabric surface. Furthermore, since there was no control of how much stock would go to different rolls in a mill, it was impossible to calender both sides of a fabric evenly. The fact that the stock would not release easily from either roll of the mill also prevented calendering. When subjected to the shear stress of an extruding screw, the stock dropped sufficiently in viscosity to make practical extrusion impossible.

It is an object of this invention, therefore, to improve the shear characteristics of fluoroalkylpolysiloxanes. It is a further object of this invention to improve the general handling characteristics of fluoroalkylpolysiloxanes.

This invention relates to a vulcanizable composition comprising (1) 3,3,3 - trifluoropropylmethylpolysiloxane containing up to ten mol percent copolymerized siloxane units of the formula $$Z_m SiO_{\frac{4-m}{2}}$$

where Z is selected from the group consisting of aliphatic hydrocarbon radicals of less than three carbon atoms and the phenyl radical and m has an average value of from 1 to 3 inclusive and (2) from 2 to 20 parts per 100 parts of siloxane (1) of a material which has a boiling point above 100° C. at atmospheric pressure and which is selected from the group consisting of organic compounds and organosilicon compounds containing the group $R_nSi$ where R is selected from the group consisting of hydrocarbon radicals, hydrocarbonoxy radicals, halogenated hydrocarbon radicals and halogenated hydrocarbon radicals containing less than 3 fluorine atoms, and n has an average value of from 1 to 4 inclusive. The remaining silicon valences are satisfied by hydrogen atoms, oxygen atoms, hydroxyl radicals and other silicon atoms.

The 3,3,3-trifluoropropylmethylpolysiloxane is best prepared by polymerizing sym-tris-3,3,3-trifluoropropyltrimethylcyclotrisiloxane according to the method described in the copending application of Oscar K. Johannson, Serial No. 594,107, filed June 27, 1956. The method of preparation of the cyclic trisiloxane is described in the copending application of Ogden R. Pierce and George W. Holbrook, Serial No. 594,108 filed June 27, 1956. Both of these copending applications are hereby made a part of this specification by reference.

In general, the polymerization of the cyclic trisiloxane is best carried out in the presence of an alkaline catalyst such as alkali metal hydroxides or the siloxane salts of alkali metal hydroxides at temperatures ranging from 50 to 150° C.

If desired, the siloxane (1) of this invention can be a copolymer of 3,3,3-trifluoropropylmethylpolysiloxane with up to 10 mol percent of siloxanes containing any combination of methyl, ethyl, vinyl and phenyl radicals. These copolymers can be prepared by the alkaline copolymerization of cyclics of the formula $(Z_2SiO)_3$ and sym-tris-3,3,3-trifluoropropyltrimethylcyclotrisiloxane as shown in the aforesaid Johannson application where Z is methyl, ethyl, vinyl or phenyl. The introduction of small amounts of the methyl, ethyl and phenyl siloxanes lowers the brittle point of the resulting rubbers. The use of limited amounts of vinyl containing siloxane units gives elastomers of superior compression set. If, however, the amount of non-fluoroalkylsiloxane is increased above 10 mol percent, inferior swell resistance results.

Specific examples of copolymers which are operative as (1) in this invention are a copolymer of 95 mol percent 3,3,3-trifluoropropylmethylsiloxane and 5 mol percent diphenylsiloxane, a copolymer of 92 mol percent 3,3,3-trifluoropropylmethylsiloxane, 5 mol percent methylvinylsiloxane and 3 mol percent phenylmethylsiloxane and a copolymer of 97 mol percent 3,3,3-trifluoropropylmethylsiloxane, 2 mol percent dimethylsiloxane and 1 mol percent divinylsiloxane.

The homopolymer and copolymers of this invention can be endblocked with any triorganosiloxane in which the organic groups are 3,3,3-trifluoropropyl and methyl, or any combination of methyl, ethyl, vinyl, and phenyl. Specific examples of such triorganosiloxanes are methylbis-3,3,3 - trifluoropropylsiloxane, 3,3,3 - trifluoropropyldimethylsiloxane, tris-3,3,3-trifluoropropylsiloxane, trimethylsiloxane, phenyldimethylsiloxane and phenylmethyl vinylsiloxane.

The new and useful improvement of this invention is the addition of 2 to 20 parts per 100 parts of (1) of a material which has a boiling point above 100° C. and which is any organic compound or any organosilicon compound (2).

Specific examples of operative organic compounds are acenaphthene, acenaphthylene, phenylhydrozoneacetaldehyde, acetamide, N-benzylacetamide, trichloroacetamide, acetanilide, o-acetaniside, benzylacetate, cetyl acetate, n-heptyl acetate, methylene diacetate, monofluoroacetic acid, ethoxyacetic acid, acetoin, 1-acetonaphthone, benzoylacetone, benzylideneacetone, acetophenone, p-aminoacetophenone, p-methoxyacetophenone, m-nitroacetophenone, o-acetotoluide, diphenylacetylene, acridine, adipic acid, diethyladipate, alizarin, triethoxyaluminum, triethylaluminum, amyl ether, amyliodide, amyl isocyanide, anethole, aniline, N,N-dipropylaniline, o-bromoaniline, anisaldehyde, anisole, anthracene, anthranil, antipyrine, apiole, arachidic acid, asaronic acid, azobenzene, benzaldehyde, o-chlorobenzaldehyde, benzaldiacetate, benzamide, 1,4-di-tert-butylbenzene, 1,3-diethylbenzene, hexaethylbenzene, 1 - bromo - 4 - iodobenzene, 1,2,3- benzenetriamine, benzidine, benzofuran, allylbenzoate, benzoin, benzophenone, benzyl alcohol, O,O'-biphenol, biphenyl, 4,4'-bipyridine, n-butylalcohol, dibutylsulfide, butyric acid, cellulose, civetone, cycloheptanol, isopropylcyclohexane, cyclohexanone, decane, dibutylamine, dichloroacetal, diethyleneglycol, 1,1-dinitroethane, 1,1-diphenylethane, pentachlorofluoroethane, bis-β-chloroisopropylether, ethyl heptyl ether, methyl o-tolyl ether, phenyl vinyl ether, 2-(chloromethyl)tetrahydrofuran, triethylphosphate, diethyl sulfite, glycerol, glycerol ether, glycol diformate, heptadecane, picrylhydrazine, indan, isoamyl iodide, 2-furyl methyl ketone, diethyl maleate, malononitrile, diethyl mercury, dipropoxy methane, n-butylmethacrylate, myrcene, naphthalene, 1-phenylnaphthalene, 1,4-dihydronaphthalene, 2-fluoronaphthalene, 2,7-dimethyloctane, 3-octanone, 2,4-dimethyl-3-phenyl-3-pentanol, stearone, 4-pentenoic acid, phenanthrene, o-cresol, phenol, o-ethoxyphenol, 2,5-dimethyl-(trans)-piperazine, 1-phenyl piperazine, piperidine, piperolidine, isoamylpropionate, pyridine, 2,5-dimethylpyrrole, 6-methoxyquinoline, 4-propyl resorcinol, salol, stearamide, stearic acid, isoamylstearate, dimethylsuccinate, terephthalic acid, propyl ester of thiocyanic acid, 2,3,5-trimethyl-thiophene, hexaethylditin, o-ethyltoluene, N,N-dimethyl-o-toluidine, β,β-diethoxy-triethylamine, tripropylamine(n), N,N'-dimethylurea, 2-ethyl-p-xylene, 2,5-dimethylaniline, monochlorobenzene, o-chloroethylbenzene, o-chlorotoluene, capronitrile and 1-chlorododecane.

Specific examples of operative organosilicon compounds (2) are tetraethylsilane, ethoxytriethylsilane, triethoxyethylsilane, n-propyl orthosilicate, isopropyl polysilicate, allyl polysilicate, octadecylsilanetriol, 2-ethylhexylcyclohexylsilanediol, dixenylsilanediol, naphthylbenzylvinylsilanol, cyclopentenyltriphenoxysilane, allyltolyldibutoxysilane, sym - tetramethyldivinyldisiloxane, octamethylcyclotetrasiloxane, sym - tetramethyldiphenyldivinyltrisiloxane, tetrabenzylsilane, dicyclohexyldiphenylsilane, α,α,α,-tribromotolyl-tris-β-chlorovinylsilane,

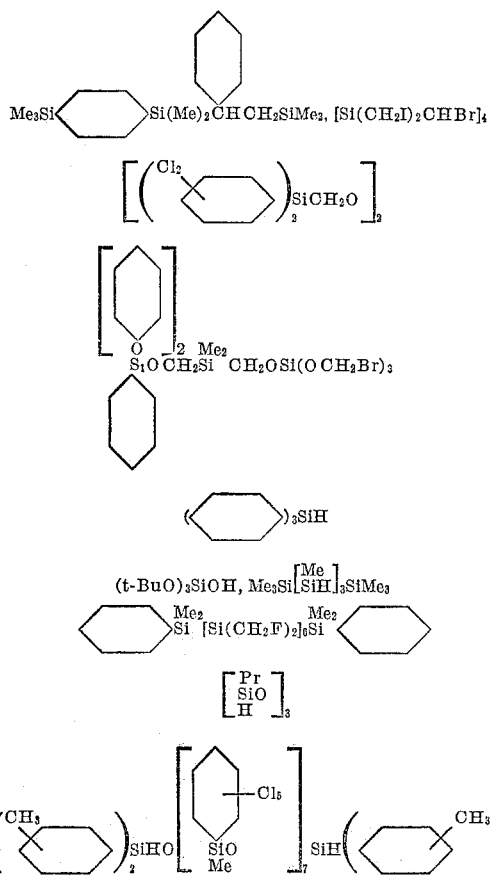

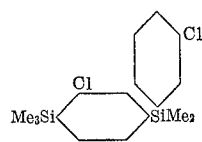

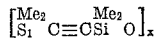

and polysiloxanes containing such units as methylvinylsiloxane 1,3-difluoro-phenyldicyclohexylsiloxane, benzylmonohydrosiloxane, xenylcyclopentenylsiloxane, 2-ethylhexylsiloxane and tritolylsiloxane. Both homopolymeric and copolymeric silicon compounds are operative as long as the boiling temperature of the compound is above 100° C. In this specification and the claims the term "silicate" includes both orthosilicates and polysilicates.

Mixtures of any organic and organosilicon compounds within the scope of the claims are operative in this invention. Materials with lower boiling points than 100° C. are impractical in that they cannot be kept in the stock during milling or calendering.

The elastomers of this invention may contain any suitable filler. The preferred fillers are inorganic materials such as metal oxides such as titania, zinc oxide, ferric oxide and the like; siliceous materials such as clay, diatomaceous earth, crushed quartz and silicas such as fume silica, silica aerogels and silica xerogels. If desired, the fillers, particularly the silicas, may be treated with chlorosilanes or in other ways so that the surfaces thereof have organosilyl groups attached to the silicon by SiOSi linkages. For example, the surfaces of the fillers can be modified with trimethylsilyl groups, phenyldimethylsilyl groups, 3,3,3-trifluoropropylmethylsilyl groups and dimethylvinylsilyl groups by the method shown in the copending application of Leslie J. Tyler, Serial No. 160,000, filed May 4, 1950.

The fillers can be employed in any desired amount ranging from 5 parts to over 200 parts per 100 parts of polymer. The precise amount of filler employed in any case will vary with the type of filler and the properties desired in the finished elastomer.

If desired, the compositions of this invention can also contain further additives such as compression set additives, pigments, oxidation inhibitors and other materials commonly employed in organosiloxane rubbers.

The elastomeric compositions of this invention can be vulcanized by heating with 0.1 to 10 percent by weight of an organic peroxide such as benzoyl peroxide or by incorporating therein the salt of a carboxylic acid such as lead-2-ethylhexoate together with a hydrogen-containing siloxane such as methylhydrogenpolysiloxane and achieving room temperature vulcanization.

The alkylsilicates have been found unexpectedly to improve oil resistance in the fluoroalkylsiloxanes of this invention. Subjection of vulcanized stocks containing alkylsilicates to hot oils does not reduce their durometer hardness to the extent that durometer hardness of vulcanized stocks without alkylsilicates is reduced. This is especially important when these rubbers are fabricated and used as seals.

The unique feature of the compositions of this invention is the unusually improved handling characteristics over previously known compositions. The compositions of this invention can be milled and calendered easily, whereas previous trifluoropropylsiloxane compositions sheared.

The compositions of this invention after vulcanization are particularly useful for the preparation of hoses, seals, linings for fuel tanks and for electrical insulation which is subjected to fluids, lubricating oils and hydraulic fluids.

The following examples are illustrative only and should not be construed as limiting the invention which is properly set forth in the appended claims.

Example 1

The following materials were blended on a two-roll mill with 100 parts by weight 3,3,3-trifluoropropylmethylpolysiloxane and 30 parts by weight silica filler:

| Sample | Parts | Additive |
|---|---|---|
| 1 | 6 | A gum copolymer of 99.86 mol percent dimethylsiloxane and 0.14 mol percent methylvinylsiloxane. |
| 2 | 9 | Same as sample 1. |
| 3 | 5 | A fluid copolymer of 58 mol percent phenylmethylsiloxane, 30 mol percent dimethylsiloxane and 12 mol percent trimethylsiloxane. |
| 4 | 9 | Dibutyl phthalate. |
| 5 | 10 | Hydroxy endblocked dimethylsiloxane containing 3.5% by weight silicon-bonded hydroxyls. |
| 6 | 3 | Same as sample 1. |
| 7 | 8 | Ethyl polysilicate. |
| 8 | 5 | 100 parts by weight of the copolymer of sample 1, 35 parts fume-silica and 25 parts diatomaceous earth. |
| 9 | 6 | Diphenylsilanediol. |
| 10 | 5 | Tri-cresylphosphate. |
| 11 | 8 | Octamethylcyclotetrasiloxane. |
| 12 | 15 | Hydroxy endblocked dimethylsiloxane containing 0.5% by weight silicon-bonded hydrosyls. |
| 13 | 10 | An aromatic petroleum hydrocarbon boiling at 190° C. |
| 14 | 8 | 2-butoxy-ethanol acetate. |
| 15 | 11 | 2-($\beta$-butoxyethoxy) ethanol acetate. |
| 16 | 16 | Monochlorobenzene. |

All of these formulated stocks showed initial satisfactory shear characteristics in staying together on one roll of the mill.

Samples 1 to 13 were aged at room temperature for one week. Samples 1 to 5 inclusive continued to show satisfactory shear characteristics.

Example 2

When 10 parts by weight of any of the following compounds are blended with 100 parts by weight 3,3,3-trifluoropropylmethylpolysiloxane and 30 parts by weight silica filler, the shear strength and handling properties of the original stock are improved:

N-benzylacetamide, monofluoroacetic acid, p-aminoacetophenone, diphenylacetylene, triethyl aluminum, amyl isocyanide, aniline, o-bromoaniline, anthracene, azobenzene, o-chlorobenzaldehyde, 1-bromo-4-iodobenzene, 1,2,3-benzenetriamine, benzidine, o,o'-biphenol, dibutylsulfide, cellulose, cycloheptene-4-ol, cyclohexanone, dibutylamine, pentachlorofluoroethane, decane, bis-$\beta$-chloroisopropylether, methyl o-tolyl ether, phenylvinyl ether, diethyl sulfite, glycerol, naphthalene, o-cresol, phenol, 1-phenyl piperazine, piperidine, pyridine, terephthalic acid, propyl ester of thiocyanic acid, hexaethylditin, N,N-dimethyl-o-toluidine, N,N-dimethylurea, o-chlorotoluene, tetraethylsilane, n-propyl orthosilicate, ethoxytriethylsilane, dibenzylvinylsilanol, sym-tetramethyldivinyldisiloxane, allyltolyldibutoxysilane, phenylmethylpolysilane,

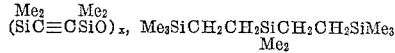

[$Pr_2SiCH_2O]_2$ and triphenylsilane.

Example 3

When silica modified with trimethylchlorosilane is substituted for the silica filler of Example 1, similar results are obtained.

Example 4

A vulcanized rubber stock sample (1) composed of 100 parts 3,3,3-trifluoropropylmethylpolysiloxane and 30 parts silica filler and a vulcanized rubber stock sample (2) composed of 100 parts 3,3,3-trifluoropropylmethylpolysiloxane, 30 parts silica filler and 8 parts ethyl polysilicate were checked with a Shore Durometer Hardness Gauge, Type "A-2," ASTM D-676. The samples were then immersed in a diester oil conforming to U.S. Government Specification MIL-O-7808 for 70 hours at 350° F. and rechecked.

The results were as follows:

| Durometer reading | Samples | |
|---|---|---|
|  | (1) | (2) |
| Before immersion | 60 | 60 |
| After immersion | 35 | 47 |
| Increment | −25 | −13 |

Example 5

When propylorthosilicate, isopropylpolysilicate and allylpolysilicate are substituted for the ethylpolysilicate of Example 4, similar results are obtained.

That which is claimed is:

1. A vulcanizable composition comprising (1) 3,3,3-trifluoropropylmethylpolysiloxane containing up to 10 mol percent copolymerized siloxane units of the formula $$Z_mSiO_{\frac{4-m}{2}}$$

where Z is selected from the group consisting of aliphatic hydrocarbon radicals of less than 3 carbon atoms, and the phenyl radical and $m$ has an average value of from 1 to 3 inclusive, (2) from 2 to 20 parts per 100 parts of siloxane (1) of a high molecular weight benzene soluble organosiloxane in which the organic radicals are hydrocarbon radicals of less than 7 carbon atoms, and (3) an inorganic filler.

2. The composition of claim 1 wherein (2) is a high molecular weight benzene soluble organosiloxane in which the organic radicals are essentially methyl radicals.

References Cited in the file of this patent

UNITED STATES PATENTS

| 2,651,651 | Simon et al. | Sept. 8, 1953 |
| 2,744,878 | Smith-Johannsen | May 8, 1956 |
| 2,833,742 | Koch | May 6, 1958 |

OTHER REFERENCES

Clark: WADC Technical Report 54–213, July 1954, Wright Air Development Center, Wright-Patterson Air Force Base, Ohio.

Glime et al.: Rubber Age, February 1951, pp. 564–565.

Kilbourne et al.: Rubber World, vol. 132, 1955, pp. 193–200.

Pfeifer et al.: India Rubber World, vol. 129, No. 4, January 1954, pp. 481–484 and 488.

UNITED STATES PATENT OFFICE
CERTIFICATE OF CORRECTION

Patent No. 3,065,201                        November 20, 1962

Thomas D. Talcott

It is hereby certified that error appears in the above numbered patent requiring correction and that the said Letters Patent should read as corrected below.

Column 4, lines 8 and 9, the formula should appear as shown below instead of as in the patent:

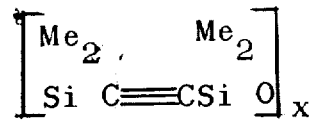

same column, line 37, for "160,000" read -- 160,100 --; column 5, line 21, for "hydrosyls" read -- hydroxyls --.

Signed and sealed this 10th day of December 1963.

(SEAL)
Attest:
ERNEST W. SWIDER

EDWIN L. REYNOLDS

Attesting Officer                     Acting Commissioner of Patents